United States Patent [19]
Glitz

[11] Patent Number: 4,563,546
[45] Date of Patent: Jan. 7, 1986

[54] METHOD FOR PREVENTING "COMPROMISING RADIATION"

[75] Inventor: Ekkehard Glitz, Backnang, Fed. Rep. of Germany

[73] Assignee: Licentia Patent-Verwaltungs-GmbH, Frankfurt am Main, Fed. Rep. of Germany

[21] Appl. No.: 398,327

[22] Filed: Jul. 15, 1982

[30] Foreign Application Priority Data

Jul. 15, 1981 [DE]  Fed. Rep. of Germany ....... 3127843

[51] Int. Cl.⁴ ............................................. H04K 1/02
[52] U.S. Cl. ............................ 178/22.01; 178/22.09; 178/22.19; 179/1.5 M
[58] Field of Search ............... 178/22.01, 22.09, 22.19; 179/1.5 M; 371/63; 455/30

[56] References Cited

U.S. PATENT DOCUMENTS

| | | | |
|---|---|---|---|
| 3,077,518 | 2/1963 | Guanella | 179/1.5 M |
| 3,133,991 | 5/1964 | Guanella | 179/1.5 M |
| 3,634,665 | 1/1972 | Carter et al. | 371/63 |
| 4,176,247 | 11/1979 | Englund | 178/22.19 |
| 4,177,355 | 12/1979 | Fleisher et al. | 178/22.09 |
| 4,225,962 | 9/1980 | Meyr et al. | 178/22.01 |
| 4,283,602 | 8/1981 | Adam et al. | 178/22.01 |
| 4,404,426 | 9/1983 | Safford | 178/22.19 |
| 4,447,672 | 5/1984 | Nakamura | 178/22.19 |

OTHER PUBLICATIONS

S 0309 0091, Elektronik, vol. 28 (1979), No. 23, pp. 51-51, Budzinski, "Data Encryption with Single Chip Computers".

L. Balliet and T. J. Wylie, "Four/Six-Block Transmission Code", *IBM Technical Disclosure Bulletin*, vol. 22, No. 8B, Jan. 1980, pp. 3547-3550.

*Primary Examiner*—Salvatore Cangialosi
*Attorney, Agent, or Firm*—Spencer & Frank

[57] ABSTRACT

A method of preventing "compromising radiation" when processing and transmitting secret data information in data processing and long-distance data transmission systems. In addition to direct, physical shielding and/or decoupling of the data signals, a code converter of per se known construction is employed which acts indirectly in the plane of the logic processing or coding of the information and which additionally processes the secret data in such a manner that at any point in time during further processing or during transport the sum of the values "0" in the data signal is equal to the sum of the values "1" so that practically no "compromising radiation" is generated thereby since the physical signals reaching the environment no longer contain any analyzable information.

8 Claims, 8 Drawing Figures

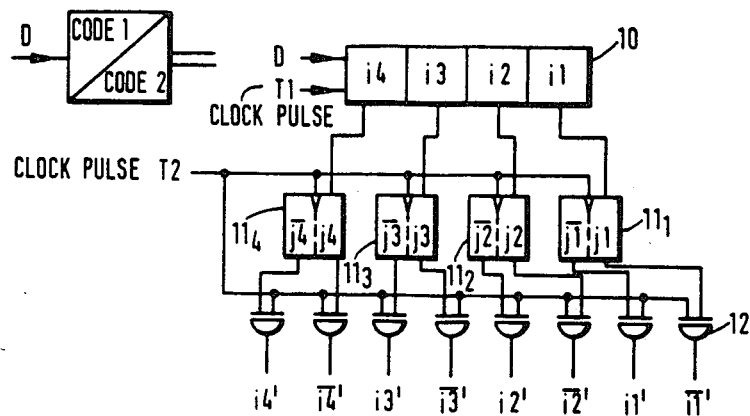
FIG. 6
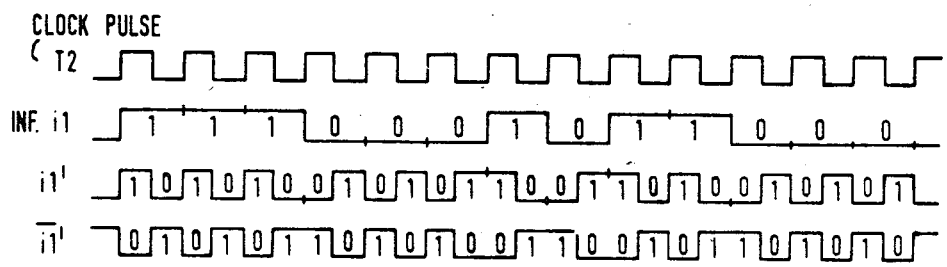
FIG. 7
| DIBIT | INFORMATION |
| --- | --- |
| $i1'$ $\overline{i1}'$ | $i1$ |
| 1  0 | BINARY 1 IN CONTINUOUS SUCCESSION |
| 0  1 | BINARY 0 IN CONTINUOUS SUCCESSION |
| 0  0 | CHANGE FROM BINARY 1 TO 0 |
| 1  1 | CHANGE FROM BINARY 0 TO 1 |
FIG. 8

METHOD FOR PREVENTING "COMPROMISING RADIATION"

BACKGROUND OF THE INVENTION

The present invention relates to a method of preventing "compromising radiation" during the processing and transmission of secret data information.

Secret information is protected against unauthorized access during transmission by means of cryptographic processes. These processes have recently been developed mathematically and technologically to such an extent that they are considered to be "unbreakable," and the security against decyphering of such processes has become calculatable. It is no longer possible for the listener to coded information to decypher the information without knowing the code material. However, the listener can use other methods of gaining information: he can evaluate the optical, acoustical, electrical or electromagnetic radiation of the devices in a system which processes codes and transmits information. Therefore, high expenditures are required to install processing centers so that they are located in shielded areas and are secure against listening-in. Data processing centers are in communication with the environment via various "channels" and each "channel" can be tapped by a listener outside the protected area. The term "channel" is here understood in the communications technology sense and a distinction is made between data channels in which information is intentionally transported, e.g., telephone lines or radio paths, and channels in which information is transported inadvertently, e.g., public electricity lines, water mains, windows, etc.

Data information is usually transmitted intentionally and unintentionally in the form of electrical signals. (An exception is the optical transmission of data). In the case of electrical signals, the signal is transmitted intentionally and unintentionally in its original signal form and also in a modulated form, e.g., AM, FM, etc. If the signal is modulated onto a high frequency carrier, it propagates through space as well as over all electrical lines. If the original signal is secret data information, the undesirable propagation and transmission is called "compromising radiation."

Since the "compromising radiation" may undermine the efficiency of cryptologic equipment, encrypting devices are checked with particular care for "compromising radiation" and much engineering effort is required to prevent such "compromising radiation."

SUMMARY OF THE INVENTION

It is therefore the object of the present invention to provide a process with which systems for processing and long-distance transmission of secret data can be produced in a simple, inexpensive manner so that they are free of "compromising radiation."

The above object is basically achieved according to the present invention in that, by means of a further code converter employed in the plane or portion of the system in which the logic processing or coding of the information takes place, secret data is additionally processed such that at any point in time during processing or transport, the sum of the values "0" of the data signal is equal to the sum of the values "1".

According to a further feature of the invention, the data is further processed such that at every point in time the number of changes from "0" to "1" in the data signal is equal to the number of changes from "1" to "0" in the data signal.

According to another feature of the invention, the complement or inverted data bit of each information data bit is formed as a dummy or pseudo information bit with the information data bit and its corresponding pseudo information data bit being processed in parallel channels such that they always appear together in space.

According to still a further feature of the invention, each data bit and its complement is converted to a dibit with each binary "1" or "0" value being converted to a dibit "10" or "01".

The present invention will now be described with an example for binary data signals. A data encyphering device has been selected as the typical example for use of the invention.

BRIEF DESCRIPTION OF THE DRAWINGS

FIG. 6 is a basic block circuit diagram of a code converter, according to still a further embodiment of the invention.

FIG. 7 is a time sequence diagram and shows the binary distribution in a code converter according to the embodiment of FIG. 6.

FIG. 8 is a truth table for the code conversion according to the embodiment of FIG. 6.

DETAILED DESCRIPTION OF THE PREFERRED EMBODIMENTS

The following is an explanation of the terms used in FIG. 1, as well as the signal class (which will be explained below) to which the respective signals belong:

| Abbreviation | Meaning of the Term | Signal Class |
| --- | --- | --- |
| DSG | data encyphering device | |
| STE | control section | black/red |
| SV | power supply | black |
| CRS | cryptocomputer at the transmitting end (Encyphering Computer) | red/black |
| CRE | cryptocomputer at the receiving end (Decyphering Computer) | black/red |
| IFDE | interface to the data end device | red |
| IFDU | interface to the data transmission/receiving device | black |
| IFKE | interface for the key code input | red |
| IFCU | interface for remote control | black |
| Main | voltage supply from mains | black |
| GA | housing connection | black |
| SE | control lines to the instrument | red |
| ME | message lines from the instrument | red |
| SU | control lines from the instrument | black |
| MU | message lines to the instrument | black |
| D1E | clear text data to the instrument | red |
| D2E | clear text data from the instrument | red |

-continued

| Abbreviation | Meaning of the Term | Signal Class |
|---|---|---|
| D1U | crypto data for transmission | black |
| D2U | crypto data from transmission | black |
| KD1E | code data to the instrument | red |
| KSE | control line code to the instrument | red |
| FSU | control line remote control to the instrument | black |
| FMU | message line remote monitoring from the instrument | black |

Figure 1:
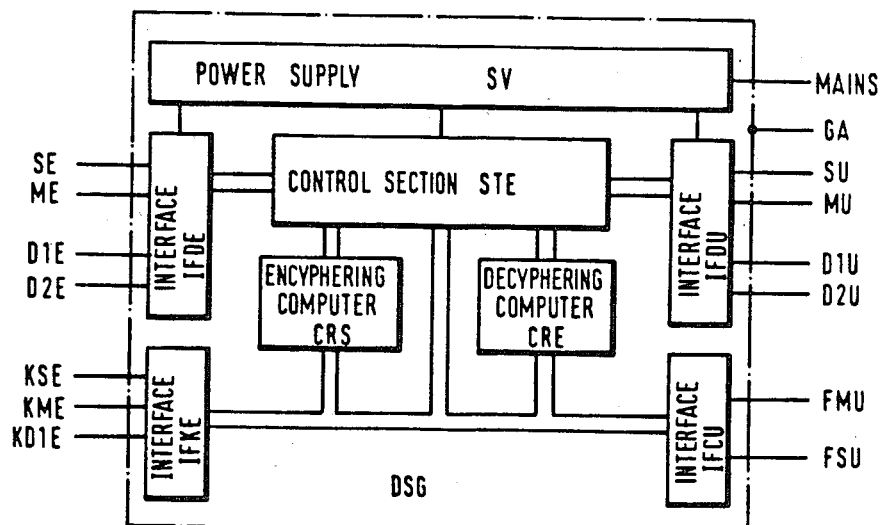
FIG. 1 is a basic block circuit diagram for a data encyphering device in connection with which the terms employed in describing the invention will be explained.

As indicated above, the circuit components and signal lines of FIG. 1 are divided into two signal classes:

Red signals—secret information is processed and transported. Unauthorized access must be prevented.

Black signals—anyone can have access to these signals.

Consequently, black signals in lines or instrument components must be separated, isolated and decoupled from the red signals.

The danger of coupling of red and black signals is caused mainly by:

(a) inductive crosstalk
(b) capacitive crosstalk
(c) joint current supplies
(d) asymmetrical signals with a common electrical reference point.

The following measures are known to decouple black and red signals:

1. shielding, high frequency sealing;
2. filter measures; and
3. galvanic separation, including
   3.1 relays,
   3.2 transformers, and
   3.3 optical couplers.

The above measures require complicated structural efforts and must be matched carefully to one another. The required control measurements and the feedback of the results to the construction of such devices are time consuming and expensive.

The solution according to the invention reduces the above-mentioned measures to a minimum and acts in the plane of logic processing of the information.

The method according to the invention is not an encyphering method, but merely serves to shape the physical signals emanating from the processing or transmission system so that no information can be obtained therefrom by an unauthorized person. This is accomplished, as indicated above, in that the information to be protected is logically processed (coded) in such a manner that the sum of the values "0" and "1" appears to be equally distributed in space and time. In other words: at any time during processing or transport, the sum of the zeros is equal to the sum of the ones, and the sum of the zeros added together up to a certain point in time is equal to the sum of the ones collected up to that point in time. That means, that, for example, an information data word "a" having 4 bits is supplemented by the addition of the inverted data word "ā" representing dummy or pseudo information so as to form an 8-bit data word which is processed in parallel. Moreover, by means of certain coding methods, it is possible to make it impossible to distinguish successive data words in time by their resulting voltage or their resulting current, respectively, so that radiation entering the environment no longer provides any information.

For serial processing or serial transport, at least two channels are used so that in one channel the original data stream, for example, is transmitted and in the other channel the inverted data stream is transmitted. In that case, at any point in time and space every data bit will appear together with its corresponding inverted data bit.

EXPLANATIONS

The information unit is the bit (binary digit). The bit is represented in binary form by either "0" and "1"; "current" and "no current"; or "low voltage" and "high voltage."

The information may be transported bit serially, e.g. over an interface according to CCITT Recommendation V.24 and on a suitable data transmission path. The information may be displayed and processed in bit parallel. A particularly frequent use is the representation in 8 bit parallel (1 byte). An information transporting system operating in the bit parallel mode is called a "data bus."

An 8-bit data bus for microprocessor systems is called a "standard data bus." An address bus is a transporting system for control information for the selection and activation of system components and memory addresses.

Figure 2:
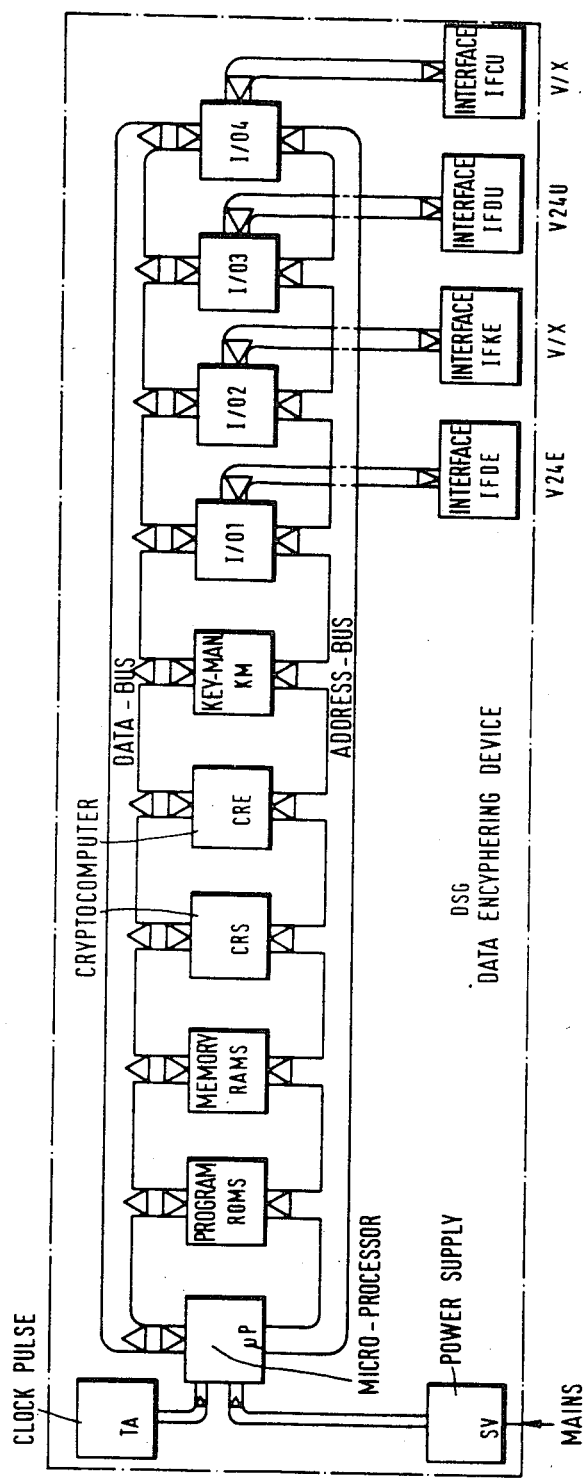
FIG. 2 is a basic function block circuit diagram for a data encyphering device with microprocessor control.

FIG. 2 shows the basic function block circuit diagram for a data encyphering device employing a microprocessor control. The microprocessor $\mu P$, is fed by the clock pulse source TA and the power supply SV, and is connected with its peripheral circuits via the data bus and the address bus. The peripheral components are addressed and activated via the address bus. On the data bus, the information is transported back and forth.

The following elements are used in the example of the data encyphering device of FIG. 2:

Program memory ROM: The program for solving the special task is stored in the program memory which is a ROM (read only memory).

Operating memory RAM: Conditions, intermediate results and final results of the operating process are stored in the operating memory which is a RAM (random access memory).

Cryptocomputer CRS/CRE: Information is encyphered in the sending or transmitting cryptocomputer CRS and decyphered in the receiving cryptocomputer CRE.

Key management KM: Here the key or code setting conditions for the cryptocomputers are stored and processed.

Input/Output I/01 . . . I/04: Here information and instructions are received from the connected peripheral devices, i.e., are brought to the data bus, and processed information and reports are transmitted to the outside.

Interface: In the interface circuits, the environment is connected to the device DSG via agreed-upon interface conditions.

(a) IFDE: Interface for the data and device. Clear text is received for encyphered transmission and is emitted after decyphering.

(b) IFKE: Interface for key input. Key or code information is put in.

(c) IFDU: Interface for data transmission. Encyphered information is emitted for transmission or received before transmission.

(d) IFCU: Interface for remote control and remote monitoring of the apparatus.

Signal lines from interface units IFDE and IFKE belong to the "red" signal class, while signal lines from the interface units IFDU, IFCU and the mains belong to the "black" signal class.

The problem is now that both "black" signal lines as well as "red" signal lines are in physical connection with the common data bus. Although it is logically predetermined in the program at which points in time only "red" or only "black" signals can pass to the associated interface, the danger of inadvertent coupling between "red" and "black" signal lines, particularly in the high frequency range, cannot be avoided in this technique. It is, therefore, the object to design the unavoidable intermodulation products between "red" and "black" signals so that an analysis of the radiated intermodulation components in the environment of the devices and on the "black" signal lines will not permit a conclusion as to the character of the "red" signals.

Figure 3:
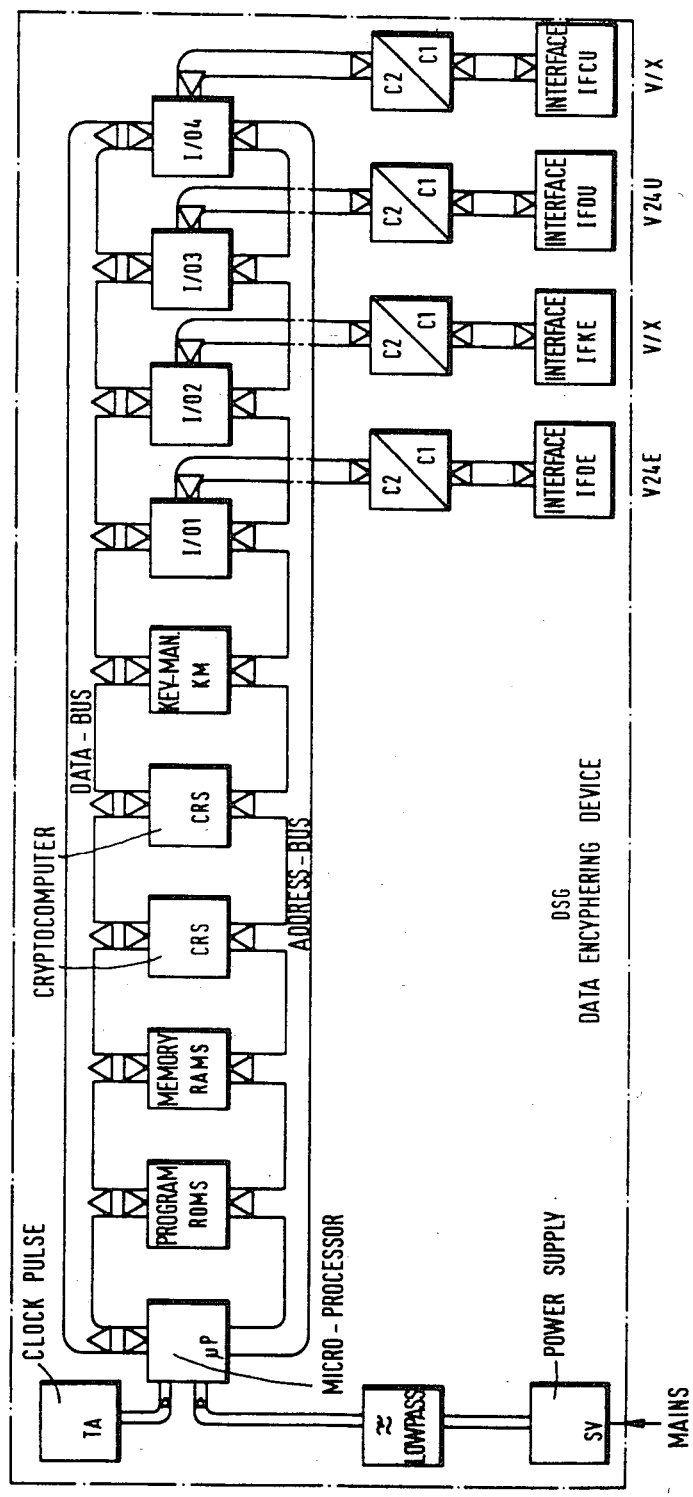
FIG. 3 is a basic block circuit diagram for a data encyphering device with code converters according to the invention.

In FIG. 3, the same data code device as shown in FIG. 2 is equipped, in its interface region, with code converters C1/C2 according to the invention connected between each of the input/output circuits I/0-1–I/04 and the associated interface circuit IFDE, IFKE, IFDU and IFCU respectively. With these measures it is accomplished that all of the information leaving or fed to the data enciphering device DSG can be processed in a balanced code. In such a code, each word has the same weight or appearance toward the outside which prevents a conclusion, during analysis, as to the type of information processed.

Figure 4:
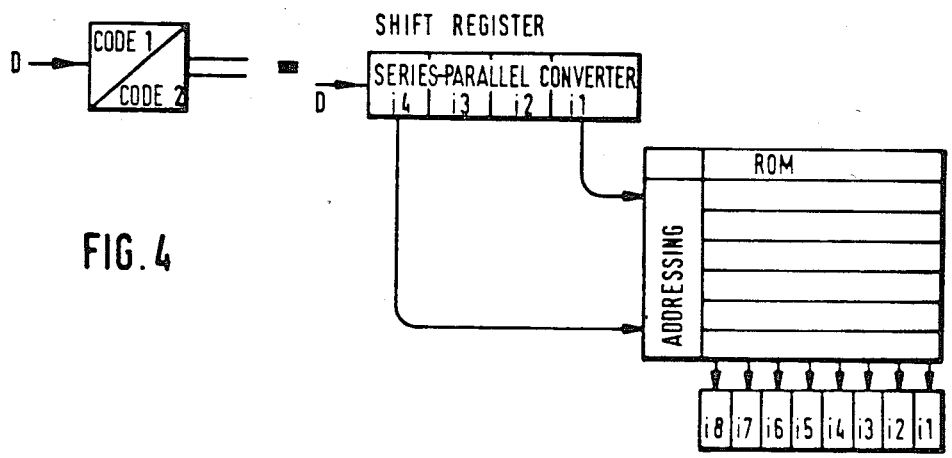
FIG. 4 is the basic block circuit diagram of a code converter, according to one embodiment of the invention.

FIG. 4 is a basic block circuit diagram for a code converter of a first type according to the invention. The data D are initially in bit serial representation and are converted to parallel representation in a shift register, which in a known manner acts as a series to parallel converter. The information in parallel representation in code 1 is then used to address a read only memory (ROM). In the ROM, the identically weighted words to correspond to the extent of code 1 are held ready in code 2. That is, as shown, from a word in code 1 of bits i1–i4, the ROM produces an output word with bits i1–i8 where in the sum of the "0" and "1" values is the same.

Figure 5:
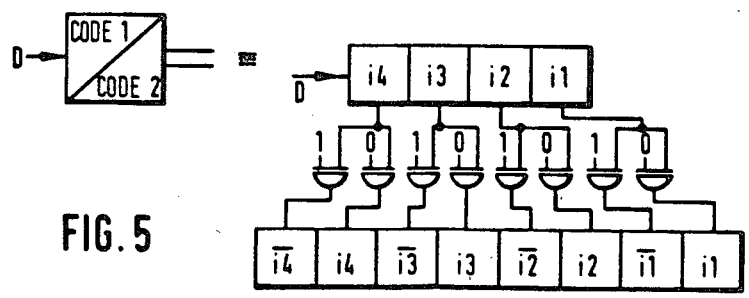
FIG. 5 is a basic block circuit diagram for a code converter, according to another embodiment of the invention.

According to FIG. 5, which is a basic block circuit diagram for a code converter of another second type, after the series to parallel conversion of the data D in the shift register, the data bits are code converted into Code 2 by formation of their complement. In the illustrated example, the outputs i1 ... i4 of the shift register are supplemented via respective exclusive-OR circuits to form the work i1, ī1, i2, ī2, i3, ī3, i4, ī4. In this way, the number of zeros and the number of ones is again balanced.

FIGS. 6, 7, 8 show the principle and operation of code converters according to the invention of still another type. In addition to coding the words as in the two previously described code converter, embodiments or types, the type or embodiment of the code converter shown and described in FIGS. 6–8 also produces an identical distribution over time. That is, according to this embodiment of the code conversion method, each bit is additionally converted to a dibit according to a given code so that even if data are put in with extreme asymmetry, such as, for example, pauses, one continuous "0" is changed to an equally distributed sequence of "0"–"1", i.e., a sequence of dibits. According to the truth table of FIG. 8, the coding may look as follows:

| Dibit | Information |
|-------|-------------|
| 10 | binary "1" in continuous succession |
| 01 | binary "0" in continuous succession |
| 00 | change of binary "1" to "0" |
| 11 | change of binary "0" to "1" |

A code converter for realizing this embodiment of the invention is shown in FIG. 6. According to FIG. 6, the data D is, as in the other embodiments, fed to a shift register 10 to convert the serial bits to a parallel bit code i1–i4. Each output of the shift register 10 is fed to the input of a respective flip-flop $11_1$–$11_4$, each of which has a direct output and a complimentary or inverted output. For example, the flip-flop $11_1$ connected to the output stage i1 of shift register 10 has a direct output j1 and an inverted output j̄1, the flip-flop $11_2$ connected to the output of stage i2 has a direct output j2 and an inverted output j̄2, etc. Each of the outputs of the flip-flops $11_1$–$11_4$ is connected to one input of a respective exclusive-OR gate 12 whose other input receives a sequence of clock pulses $T_2$. The clock pulses $T_2$ are simultaneously fed to the clock pulse or toggle input of each of the flip-flops $11_1$–$11_4$. At the outputs of the respective exclusive-OR gates, there are formed the respective dibits and their complements corresponding to the code conversion according to the invention.

FIG. 7 shows an example of the time sequence of a code conversion from the converter arrangement of FIG. 6 for the conversion of the data bit from stage i1 of shift register 11. The conversion for the other shift register stages is the same.

As shown in FIG. 6, the direct output j1 of flip-flop $11_1$ produces a "1" binary output whenever the clock pulse $T_2$ is present, i.e., has a "1" value, and the signal i1 is a "1" or whenever the clock pulse $T_2$ is not present, i.e., has a "0" value, and the signal i1 is a "0", and produces a "0" binary output whenever the clock pulse signal $T_2$ is not present and the signal i1 is a "1" or whenever the clock pulse signal is present and the signal i1 is a "0". The j̄1 output produces the complement of the signal at output j1. The exclusive-OR gate 12 connected to the direct output j1 thus forms the complement ī1' of the dibit corresponding to a binary "1" according to the truth table of FIG. 8 while the exclusive-OR gate 12 connected to the inverted output j̄1 of flip-flop $11_1$ forms the desired dibit corresponding to a binary value "1" for signal i1, i.e. "10". As further shown in FIG. 7, upon a change in the binary value of i1 from a binary "1" to a binary "0", the dibit "00" is produced at the output i1' and upon a change from binary "0" to binary "1", the dibit "11" is produced at the output i1'. Thus, with this arrangement the four bits of useful information produced by stage i1–i4 are converted to eight bits of useful information and eight bits of pseudo information, i.e., four dibits i1'–i4' of useful information and four dibits ī1'–ī4' of pseudo or dummy information, so as to prevent compromising radiation.

It will be understood that the above description of the present invention is susceptible to various modifications, changes and adaptations, and the same are intended to be comprehended within the meaning and range of equivalents of the appended claims.

What is claimed is:

1. A method for preventing "compromising radiation" when processing and transmitting digitally coded secret data information in a data processing and long-distance data transmission system, which is in addition to direct, physical shielding and decoupling of the data signals, said method comprising: by means of a further code converter disposed in the portion of the system in which logic processing of the information takes place, additionally processing each digital data signal supplied to said system portion to cause the sum of the values "0" in the data signal to be equal to the sum of values "1" at any point in time during further processing or transport of said data signal in at least said system portion and over a period of time during further processing or transport of said data signal in at least said system portion, whereby substantially no "compromising radiation" is generated by the data signal since the physical signals reaching the environment no longer contain any analyzable information.

2. A method as defined in claim 1 wherein said step of additionally processing further comprises: additionally processing the data such that at every point in time the number of changes from "0" to "1" in the data signal is equal to the number of changes from "1" to "0" in the data signal.

3. A method as defined in claim 2 wherein said step of additionally processing includes: forming the inverted data bit for each information data bit so as to represent pseudo information and combining both the information and the pseudo information data bits into a word to be further processed or transported in bit parallel, with the bit serial processing or transport of the individual words taking place in two channels so that the information in one channel and the pseudo information in the other channel have the effect that the inverted data bit always appears together in space with each respective data bit.

4. A method as defined in claim 2 or 3 further further comprising converting each information data bit to a data dibit, with a continuous binary sequence "1" being converted into a sequence of dibits "10" and a continuous binary sequence "0" being converted into a sequence of dibits "01", respectively.

5. A method as defined in claim 4 further comprising representing a change from binary "1" to "0" is represented by the dibit "00" and representing a change from binary "0" to "1" by the dibit "11".

6. A method as defined in claim 4 wherein said step of converting each data bit to a data dibit takes place prior to said step of forming the inverted data bit.

7. Method as defined in claim 1, 2, or 3 including processing the data information byte-serially with 4 bits of useful information and 4 bits of pseudo information or with 8 bits of useful information and 8 bits of pseudo information.

8. Method as defined in claim 4 including processing the data information byte-serially with 4 bits of useful information and 4 bits of pseudo information or with 8 bits of useful information and 8 bits of pseudo information.

* * * * *